UNITED STATES PATENT OFFICE.

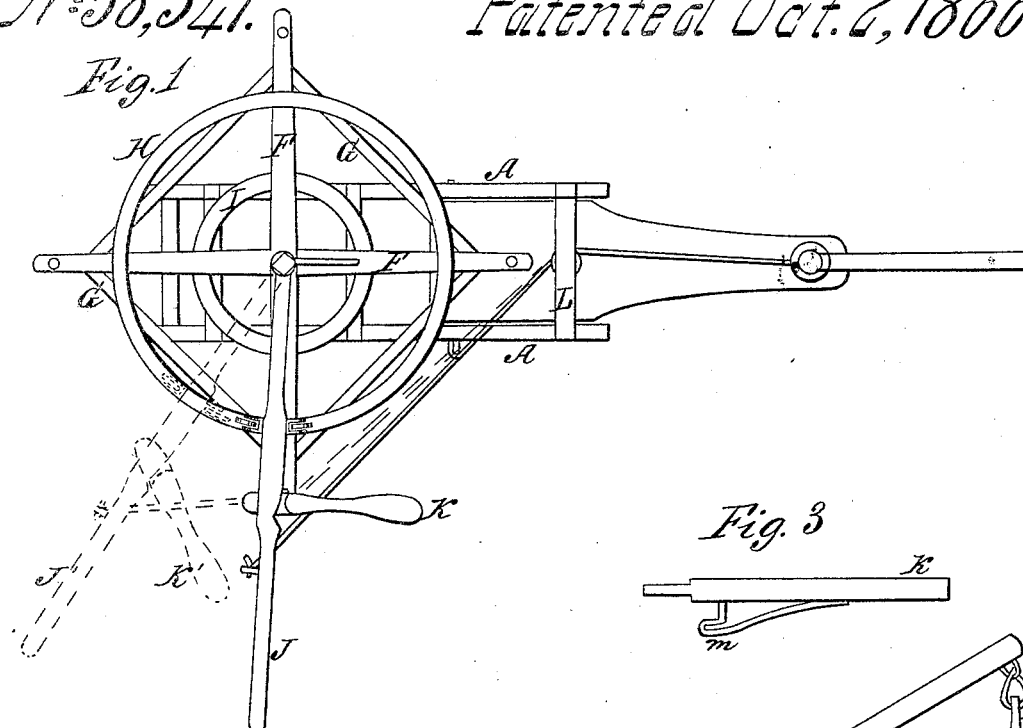
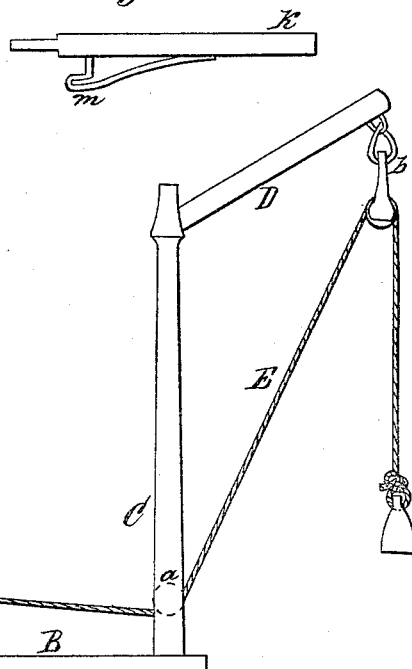
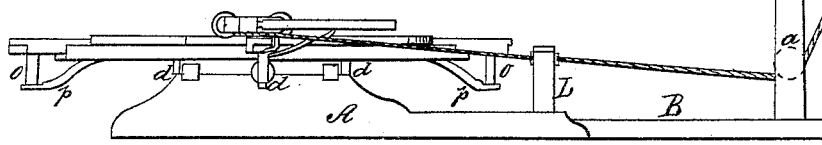

PHINEAS C. ELLSWORTH, OF VENICE, NEW YORK, ASSIGNOR TO HIMSELF AND M. SALIZBIERY, OF SAME PLACE.

IMPROVEMENT IN HAY-ELEVATORS.

Specification forming part of Letters Patent No. 58,541, dated October 2, 1866.

*To all whom it may concern:*

Be it known that I, PHINEAS C. ELLSWORTH, of Venice, in the county of Cayuga and State of New York, have invented certain new and useful Improvements in Hay-Elevators; and I do hereby declare that the following is a full, clear, and exact description of the same, reference being had to the accompanying drawings, and to the letters of reference marked thereon.

In the annexed drawings, making part of this specification, A represents the frame of the machine, which consists of two side pieces firmly connected together by means of suitable cross-ties.

Pivoted between the two side pieces of the frame A is a platform, B, which extends out beyond the frame, and which has erected upon its outer end a strong standard or upright, C. This upright C has an arm, D, extending out from it near its upper end. To the outer end of the arm D is a link and pulley-block, *b*.

In the upright C, and near its lower end, is pivoted a pulley, *a*. A cord, E, passes under the pulley *a*, and thence up and over the pulley in the block *b*.

The frame A has pivoted to its cross-ties four rollers, *d d d d*, which assist in supporting a revolving reel, which will be described. This reel consists of two cross-pieces, F F, a rectangular square frame-work, G, and two concentric rims, H and I, all secured firmly together.

A pin passes up from one of the cross-ties of the frame A, and through the two pieces F F at the point where they cross each other.

J represents a lever, which is provided with an opening or hole in its inner end, through which the pin just spoken of passes. The lever works loosely upon said pin over the reel.

K represents a trip-handle, one end of which is mortised and pivoted in the lever J, about midway of it.

The handle K is provided on its under side with a metallic bar, bent so as to form a stop, as represented in Figure 3.

When the handle stands at right angles to the lever the stop *m* catches against the end of one of the cross pieces F; but when its outer end is thrown outward, as shown in red lines, the stop *m* passes by the end of the cross-piece, and the reel can be revolved without the lever turning with it.

The inner end of the rope or cord E, after passing around a pulley in a bridge or upright, L, upon the platform B, secures to the lever J.

*p p* represent supports, which are secured at their inner ends to and under the cross-pieces F. *o o* represent rollers, which have their lower bearings in the outer ends of the supports *p* and their upper bearings in the pieces F.

In using this machine, it will be seen that the horse is attached to the lever J, the hay being previously secured upon the outer end of the cord E. As the horse walks around, drawing the lever, the reel revolves and winds the cord around it over the rollers *o o*, thus elevating the hay. When the hay has been raised sufficiently high and is removed the trip-handle K is turned, as shown in red lines, Fig. 1, and the lever is turned back, the horse being detached.

By this arrangement it will be seen that the horse always walks in one way and does not have to be turned back in order to draw up a fresh load of hay.

What I claim as new, and desire to secure by Letters Patent, is—

The arrangement of the reel, the lever J, the cord E, and the trip-handle K, constructed substantially as specified, for the purpose set forth.

As evidence that I claim the foregoing I have hereunto set my hand in the presence of two witnesses.

PHINEAS C. ELLSWORTH.

Witnesses:
SYLVANUS M. GILLETT,
H. W. BLASHFIELD.